(12) United States Patent
Chaturvedi et al.

(10) Patent No.: US 9,536,332 B2
(45) Date of Patent: Jan. 3, 2017

(54) DISPLAY OF GRAPHICAL REPRESENTATIONS OF LEGENDS IN VIRTUALIZED DATA FORMATS

(71) Applicant: INTERNATIONAL BUSINESS MACHINES CORPORATION, Armonk, NY (US)

(72) Inventors: Nitin Chaturvedi, Pune (IN); Deepak A. Deshpande, Pune (IN); Aniket R. Pal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/162,832

(22) Filed: May 24, 2016

(65) Prior Publication Data
US 2016/0253829 A1 Sep. 1, 2016

Related U.S. Application Data

(63) Continuation of application No. 15/041,416, filed on Feb. 11, 2016, now Pat. No. 9,390,529, which is a
(Continued)

(51) Int. Cl.
*G06F 17/30* (2006.01)
*G06F 3/048* (2013.01)
(Continued)

(52) U.S. Cl.
CPC .............. *G06T 11/206* (2013.01); *G06F 3/01* (2013.01); *G06F 3/0485* (2013.01);
(Continued)

(58) Field of Classification Search
CPC .............. G06F 17/30994; G06F 11/323; G06F 11/3409; G06F 17/246
(Continued)

(56) References Cited

U.S. PATENT DOCUMENTS 6,842,176 B2 1/2005 Sang'udi et al.
7,844,892 B2 11/2010 Shewchenko et al.
(Continued)

OTHER PUBLICATIONS

Riche et al., "Understanding Interactive Legends: a Comparative Evaluation with Standard Widgets", Eurographics/IEEE-VGTC Symposium on Visualization 2010, vol. 29, No. 3, 2010, pp. 1-10.*
(Continued)

*Primary Examiner* — Jin-Cheng Wang
(74) *Attorney, Agent, or Firm* — Kristofer L. Haggerty

(57) ABSTRACT

A computer-implemented method for displaying graphical representation of legends in a data visualization engine is provided. The computer-implemented method includes receiving input to configure a plurality of swatches of the legends of graphical charts, the input comprises at least one of a threshold number of swatches, an identification of graphical area for displaying the swatches, and a size or a data of the swatches for display in the graphical charts of the data visualization engine. The computer-implemented method further includes modifying the legend swatches, based on the received input. The computer-implemented method further includes generating a plurality of graphical charts of the data visualization engine for displaying the swatches, based on the modification, wherein the display is generated randomly, based on at least one user preference for displaying the swatches.

1 Claim, 7 Drawing Sheets

Related U.S. Application Data continuation of application No. 14/493,418, filed on Sep. 23, 2014.

(51) Int. Cl.

| | | |
|---|---|---|
| *G06F 3/0485* | (2013.01) | |
| *G06T 11/20* | (2006.01) | |
| *G06F 11/32* | (2006.01) | |
| *G06F 17/24* | (2006.01) | |
| *G06F 11/34* | (2006.01) | |
| *G06T 11/60* | (2006.01) | |
| *G06F 3/01* | (2006.01) | |

(52) U.S. Cl.
CPC ........ *G06F 11/323* (2013.01); *G06F 11/3409* (2013.01); *G06F 17/246* (2013.01); *G06F 17/30994* (2013.01); *G06T 11/60* (2013.01)

(58) Field of Classification Search
USPC .. 345/440, 440.1, 440.2, 441, 442; 715/810, 764, 769; 707/603
See application file for complete search history.

(56) References Cited

U.S. PATENT DOCUMENTS

| | | | |
|---|---|---|---|
| 8,239,765 B2 | 8/2012 | Alsbury et al. | |
| 8,321,781 B2 | 11/2012 | Tolle | |
| 8,527,909 B1 | 9/2013 | Mullany | |
| 9,122,668 B1 | 9/2015 | Wacha et al. | |
| 2007/0126736 A1 | 6/2007 | Tolle et al. | |
| 2007/0165049 A1 | 7/2007 | Murawski et al. | |
| 2008/0195930 A1 | 8/2008 | Tolle | |
| 2010/0162152 A1 | 6/2010 | Allyn et al. | |
| 2011/0115814 A1 | 5/2011 | Heimendinger et al. | |
| 2011/0246873 A1 | 10/2011 | Tolle et al. | |
| 2012/0324388 A1 | 12/2012 | Rao et al. | |
| 2013/0132872 A1* | 5/2013 | Milirud ................. | H04L 43/045 715/764 |
| 2013/0212508 A1 | 8/2013 | Barsoum et al. | |
| 2014/0075380 A1 | 3/2014 | Milirud et al. | |
| 2014/0282147 A1 | 9/2014 | Kim et al. | |
| 2014/0317130 A1 | 10/2014 | Thope et al. | |
| 2015/0040052 A1 | 2/2015 | Noel et al. | |
| 2015/0058778 A1 | 2/2015 | Tokuoka et al. | |
| 2015/0088808 A1* | 3/2015 | Tyagi ................ | G06F 17/30994 707/603 |
| 2015/0339032 A1 | 11/2015 | Bandera et al. | |

OTHER PUBLICATIONS

Kwon, et al., "Direct Manipulation Through Surrogate Objects", Proceedings of the SIGCHI Conf. on Human Factors in Computing Systems, CHI 2011, May 7-12, 2011, Vancouver, BC, Canada, pp. 627-636.*

"Displaying a Legend in a Chart Control", http://v8doc.sas.com/sashtml/af/z1239368.htm, pp. 1-2, accessed on Sep. 19, 2014.

Riche et al., "Understanding Interactive Legends: a Comparative Evaluation with Standard Widgets", Eurographics/IEEE-VGTC Symposium on Visualization 2010, vol. 29, 2010, No. 3, pp. 1-10.

"Formatting the Legend on a Chart", http://technet.microsoft.com/en-us/library/bb677428%28v=sql.100%29.aspx, pp. 1-3, accessed on Sep. 19, 2014.

Fusioncharts, "How can I display legend in Pie & Doughnut charts?", http://kb.fusioncharts.com/questions/398/How+can+I+display+legend+in+Pie+%26+Doughnut+charts%3F, pp. 1-2, accessed on Sep. 19, 2014.

Fusioncharts, "Interactive Legend", http://www.fusioncharts.com/demos/features/#interactive-legend, pp. 1-4, accessed on Sep. 19, 2014.

Chaturvedi et al., Pending U.S. Appl. No. 14/493,418, filed Sep. 23, 2014, titled "Display of Graphical Representations of Legends in Virtualized Data Formats," pp. 1-30.

Chaturvedi et al., Pending U.S. Appl. No. 15/041,416, filed Feb. 11, 2016, titled "Display of Graphical Representations of Legends in Virtualized Data Formats," pp. 1-27.

IBM: List of IBM Patents or Patent Applications Treated As Related (Appendix P), Aug. 3, 2016, pp. 1-2.

Medical Center Library, "PowerPoint 2003, Working with charts", retrieved on Feb. 21, 2016 by the examiner from the hyperlink: http://libraries.ucsd.edu/clinlib/tutorials/powerpoint/Working%20with%20Charts.pdf, pp. 1-12.

* cited by examiner

US 9,536,332 B2

DISPLAY OF GRAPHICAL REPRESENTATIONS OF LEGENDS IN VIRTUALIZED DATA FORMATS

BACKGROUND

The present invention relates generally to mobile computing devices, and more particularly to display of graphical representations of legends in virtualized data formats of mobile computing devices. Charts are graphical representation of data, which may be represented by symbols, such as, bars in a bar chart, lines in a line chart, or slices in a pie chart. Charts are often used to ease understanding of large quantities of data, and the relationships between parts of the data. For example, when data appearing in a chart contains multiple variables, the chart may include a legend. A legend contains a list of the variables appearing in the chart and an example of their appearance. This information thus allows the data from each variable to be identified and displayed in the chart.

SUMMARY

According to one embodiment, a computer-implemented method for displaying graphical representation of legends in a data visualization engine, the computer-implemented method comprises receiving, by a mobile systems application, input to configure a plurality of swatches of the legends of graphical charts, the input comprises at least one of a threshold number of swatches, an identification of graphical area for displaying the swatches, and a size or a data of the swatches for display in the graphical charts of the data visualization engine. The computer implemented method further includes modifying, by the mobile systems application, the legend, based on the received input. The computer-implemented method further includes generating, by the mobile systems application, a plurality of graphical charts of the data visualization engine for displaying the swatches, based on the modification, wherein the display is generated randomly, based on at least one user preference for displaying the swatches.

According to another embodiment, a computer system for displaying graphical representation of legends in a data visualization engine, the computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions to receive input to configure a plurality of swatches of the legends of graphical charts, the input comprises at least one of a threshold number of swatches, an identification of graphical area for displaying the swatches, and a size or a data of the swatches for display in the graphical charts of the data visualization engine. The computer system further comprises program instructions to modify the swatches, based on the received input. The computer system further comprises program instructions to generate a plurality of graphical charts of the data visualization engine for displaying the swatches, based on the modification, wherein the display is generated randomly, based on at least one user preference for displaying the swatches.

According to yet another embodiment, a computer program product for displaying graphical representation of legends in a data visualization engine, the computer program product comprises one or more processors, one or more computer-readable memories, one or more computer-readable tangible storage devices and program instructions which are stored on at least one of the one or more storage devices for execution by at least one of the one or more processors via at least one of the one or more memories. The computer program product further comprises program instructions program instructions to receive input to configure a plurality of swatches of the legends of graphical charts, the input comprises at least one of a threshold number of swatches, an identification of graphical area for displaying the swatches, and a size or a data of the swatches for display in the graphical charts of the data visualization engine. The computer program product further comprises program instructions to modify the legend swatches, based on the received input. The computer program product further comprises program instructions to generate a plurality of graphical charts of the data visualization engine for displaying the swatches, based on the modification, wherein the display is generated randomly, based on at least one user preference for displaying the swatches.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
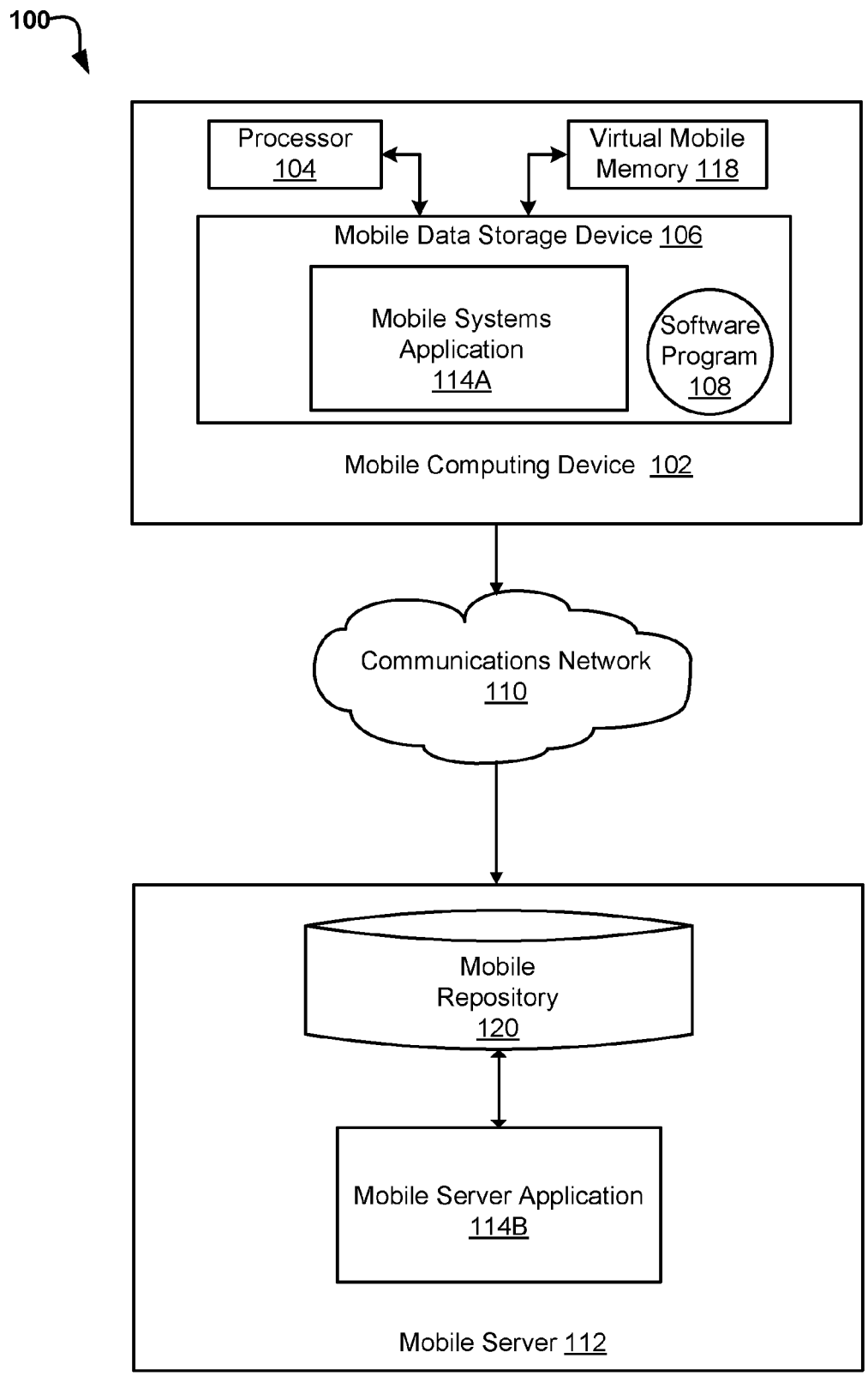
FIG. 1 illustrates a networked computer environment according to one embodiment.

Detailed embodiments of the claimed structures and methods are disclosed herein; however, it may be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Graphical chart representations of data may include a main chart display section and a legends display section, for providing details of the data. The main chart section may include docked display of the data, in a form of a chart, such as, a single docked "Pie Chart", or a "Column" of information, of the data, of the main chart display section. However, the legends display section is typically not docked to a chart area of the main chart display section, but is generally displayed in a separate section of the graphical chart representations. The legends display section may provide capabilities for distinguishing between numerous data points of the data. One of the capabilities of the legends display section may include a display of swatches in the legends display section, for providing additional distinguishing features of the data.

However, it may be difficult to display a main chart display section and a legends display section in mobile computing devices, due to lack of display space, or area for displaying data of the graphical chart representations, in the displays of the main chart display section and a legends display section, all within a single instance of display of the mobile computing devices. As such, it may be advantageous, among other things, to provide a system to display main chart display sections and legends display sections, based on configuration of swatches of the legends display sections, for display of the data of the graphical chart representations in the mobile computing devices, whereby the display of the swatches is based on preferences of a user, client, or systems administrator of the mobile computing devices, for displaying the graphical chart representations.

Embodiments of the present invention relates generally to mobile computing devices, and more particularly to display of graphical representations of legends in virtualized data formats of mobile computing devices. The embodiments include one or more circuits, or subassemblies of circuits, as well as, a system, or computer-implemented methods of operation for displaying graphical representations of legends in a data visualization engine of the mobile computing devices.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that may direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The embodiments will now be described in detail with reference to the accompanying Figures. Referring to FIG. 1, mobile system environment 100, for displaying representations of charts, diagrams, or graphs, of data, or information of graphical displays of a plurality of virtualized mobile applications, whereby, the graphs are displayed in legends, based on client preferences, or configurations, for displaying swatches of the legends, in the plurality of virtualized mobile applications, of the mobile system environment 100, according to embodiments, is depicted. For example, in the illustrated environment, the mobile system environment 100 may include a mobile computing device 102 with a processor 104, a mobile data database storage 106, and virtual mobile memory 118 which is enabled to run, or execute program instructions of a software program 108. The mobile computing device 102 may include a mobile systems application 114A, for configuring client preferences of the swatches, for displaying the legends of the mobile computing device 102.

The mobile system environment 100 may also include a mobile server 112, running a mobile server application 114B, and interconnected with mobile computing device 102, over mobile communications network 110, for providing a virtualized mobile framework for displaying representations of the charts of legends, based on the client preferences of the mobile computing device 102. The mobile server application 114B may also enable the delivery and operation of secure, personalized applications to mobile computing device 102, for displaying representations of charts, diagrams, or graphs, of data, or information of graphical displays of mobile computing device 102. The mobile system environment 100 may also include a plurality of mobile computing device 102 and mobile server 112, only one of which is shown, at least in FIG. 1.

The virtual mobile memory 118 may comprise, for example, one or more computer-readable storage media, which may include random-access memory (RAM) such as various forms of dynamic RAM (DRAM), e.g., DDR2 SDRAM, or static RAM (SRAM), flash memory, or any other form of fixed or removable mobile computing storage medium that may be used to carry or store desired program code and program data in the form of instructions or data structures and that may be accessed by other components of mobile computing device 102, for ensuring that display of virtualized graphical contents of charts, diagrams, or graphs, of data, or information of the mobile computing device 102, are displayed in the form of legends, based on the client preferences, in mobile computing device 102.

The mobile communications network 110 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements. The mobile computing device 102 may communicate with the mobile server application 114B, running on mobile server 112, via the mobile communication network 110, for providing a virtualized mobile framework for displaying representations of charts of legends, based on the client preferences of the mobile computing device 102. The mobile communications network 110 may also include connections, such as wire, wireless communication links, or fiber optic cables. As will be discussed with reference to FIG. 7, mobile server 112 may include internal components 800a and external components 900a, respectively, and computer 102 may include internal components 800b and external components 900b, respectively.

The mobile computing device 102 may be any portable device that provides computing, information storage and, computing retrieval capabilities, including, for example, a handheld device, or handheld computer, pocket PC, connected organizer, electronic book (eBook) reader, a personal digital assistant (PDA), a smart phone, or other portable devices, or any type of computing devices capable of accessing a network for providing a virtualized mobile framework for displaying representations of charts of swatches of legends, based on client preferences of the mobile computing device 102, in accordance with embodiments. The mobile computing device 102 may also be laptop, tablet, or notebook personal computer (PC), a desktop computer, a mainframe or mini computer, or a personal digital assistant (PDA).

The mobile data storage device 106 of the mobile computing device 102 is any type of storage device, storage server, storage area network, redundant array of independent discs (RAID), cloud storage service, or any type of data storage. The mobile database 106 may also be a relational model database server for storing program instructions for displaying representations of charts of swatches of legends, based on client preferences of the mobile computing device 102.

The mobile server 112 may be, for example, a server computer system such as a management server, a web server, or any other electronic device or computing system capable of receiving and sending data, including, for displaying representations of charts of swatches of legends, based on client preferences of the mobile computing device 102. Further, the mobile server 112 may also represent a "cloud" of computers interconnected by one or more networks, whereby mobile server 112 may be a primary server for a computing system utilizing clustered computers when accessed through mobile communications network 102. For example, a cloud computing system may be an implementation of a virtualized mobile system for displaying representations of charts, diagrams, or graphs, of data, or information of graphical displays, based on client preferences, or configurations. The mobile repository 120 is any type of storage device, storage server, storage area network, redundant array of independent discs (RAID), cloud storage service, or any type of data storage for storing information relating to graphical displays of legends, based on client preferences, or configurations of mobile server 112.

Figure 2:
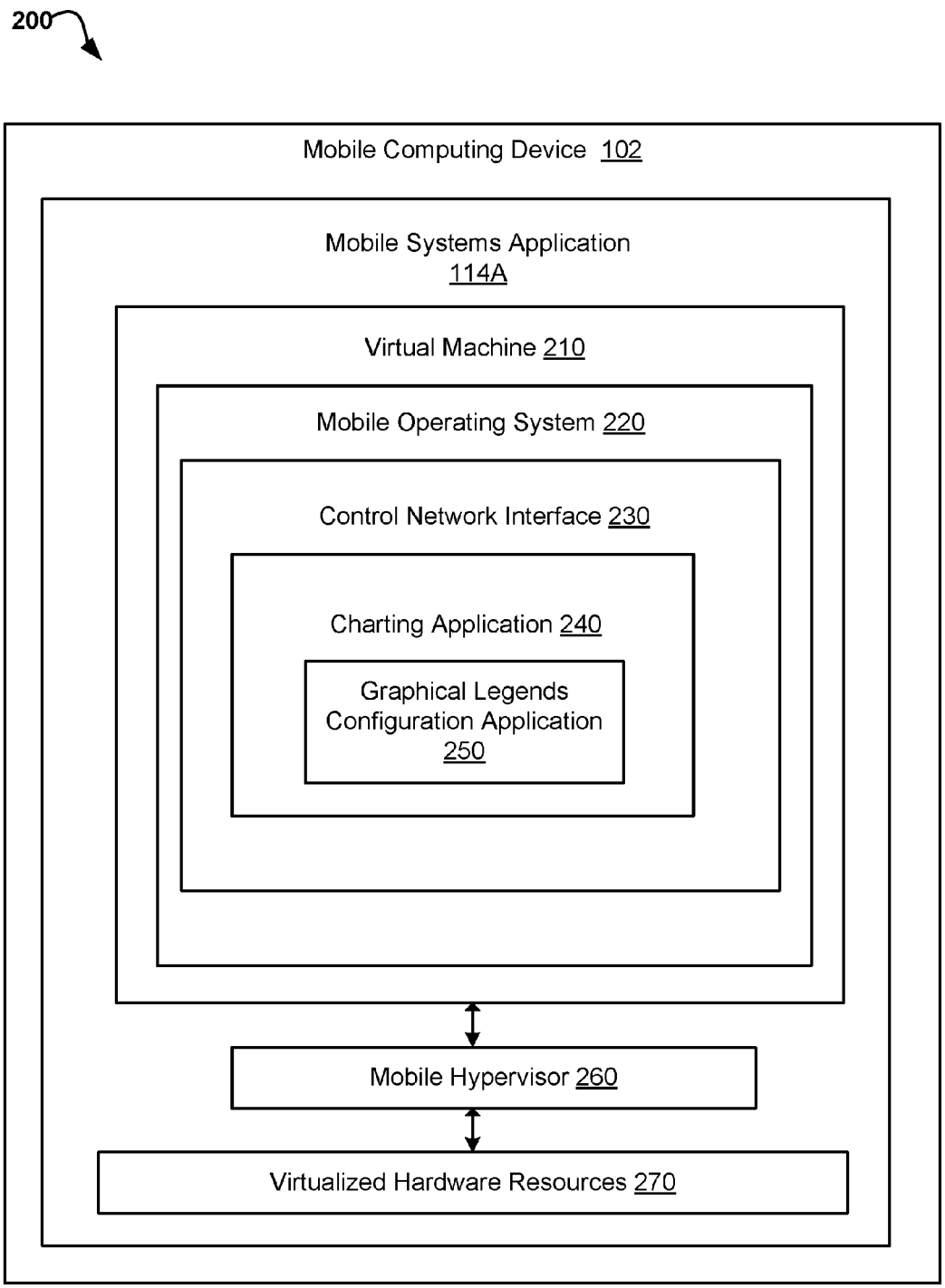
FIG. 2 illustrates the components and algorithms associated with a mobile systems environment according to at least one embodiment.

Referring now to FIG. 2, a functional block diagram 200 illustrating program components and algorithms associated with mobile systems application 114A, in accordance with embodiments.

The mobile systems application 114A may be a web browser plug-in system application program that provides an administrative user-interface, for displaying visualization of swatches of legends in a graphical representation of information, based on preferences, of user, client, or systems administrator, of the mobile systems application 114A, whereby, according to at least on embodiment, the display is based on customized configurations of swipe inputs of swatches of the legends, configured by the client in the administrative user-interface. For example, the computing interface also provides mobile system application functions for configuring the swipe inputs, in the administrative interface, as described below. Also, the mobile systems application 114A may access the mobile systems application 114B, running on mobile server 112, for displaying visualization of swatches of legends of virtualized graphical representations of information of mobile computing device 102. The mobile systems application 114A may be centralized on the mobile server 112, and also it may be divided between two different components: server-side and client-side.

The mobile systems application 114B, running on mobile server 112 may interact with the web browser of mobile systems application 114A, for transmission of the user configurations for displaying the graphical representation of data in the mobile computing device 102. For example, the mobile systems application 114A may implement a mobile virtualized computing platform for displaying graphical representation of swatches of legends, based on client preferences in a data visualization engine of the mobile systems application 114A.

Also, the mobile application environment 114A may include a hardware virtualization system that enables multiple operating systems, or virtual machines to run or operate simultaneously, and display a virtual, graphical representation of the swatches of legends in the user-interface of the mobile systems application 114A.

For example, in the illustrated environment, the mobile systems application 114A includes virtual machine (VM) 210, mobile hypervisor 260 and virtualized hardware resources 270. The VM 210 provides a virtualized system application platform for supporting the display of the graphical representation of swatches in the user-interface. The VM 210 also executes programs, or applications in mobile operating system (OS) 220, for displaying the graphical representation of swatches, based on configured the client preferences in the mobile systems application 114A.

For example, The VM 210 utilizes data or information of an external source, or of the user, and generates the chart as the output in the mobile OS 220. Also, the VM 210 may also execute program instructions for displaying the information, or data, in a virtualized data format, for display in the mobile computing device 102. For example, the mobile OS 220 may be Android® (Android and all Android-based trademarks and logos are trademarks or registered trademarks of Google, Inc. and/or its affiliates) or Blackberry® OS (Blackberry and all Blackberry-based trademarks and logos are trademarks or registered trademarks of Blackberry, Inc. and/or its affiliates).

The virtualized hardware resources 270 may include, for example, virtual processors, virtual disks, virtual memory or virtual network interfaces that are allocated to VM 210 for executing program operations of mobile OS 220. Also, the mobile hypervisor virtualizes virtualized hardware resources 270, and controls processor scheduling and memory partitions for executing program operations of mobile OS 220, for displaying the graphical representations of charts, based on the user's configured preferences. The mobile OS 220 includes control network interfaces 230, which operates to display the graphical representation of swatches of legends in a data virtualization engine of the VM 210, based on the user, or client preferences.

The control network interface 230 may be a mobile web browser application, a standalone mobile web page graphics display application or part of a service that monitors and interacts with a mobile web browser or graphical display application of VM 210. The control network interface 230 may, among other things, retrieve and display mobile content of mobile communications environment 100 (FIG. 1) via communications network 110 (FIG. 1).

The control network interface 230 includes a charting application 240. The charting application 240 is a computer program that is used to create a graphical representation of information, in a chart display interface of mobile operating system 220, based on non-graphical data or information. For example, the charting application 240 can retrieve information, or data either from the user or from some external source, and create a chart based on the data in the mobile OS 220. The charting application 250 includes, graphical legends configuration application 250, which enables the user, or the systems administrator of mobile OS 220 to configure the display of the legends, in the graphical legends configuration application 250 of the charting application 230, based on preferences of a user, or systems administrator for displaying the graphical representations of the legends in mobile computing device 102, according to embodiments. For example, mobile systems application 114A may receive an input to configure a plurality of swatches of the legends of graphical charts, whereby, the input may include at least one of a threshold number of swatches, identification of graphical area for displaying the swatches, and size or data of the swatches for display in the graphical charts of the data virtualization engine, according to embodiments.

Figure 3:
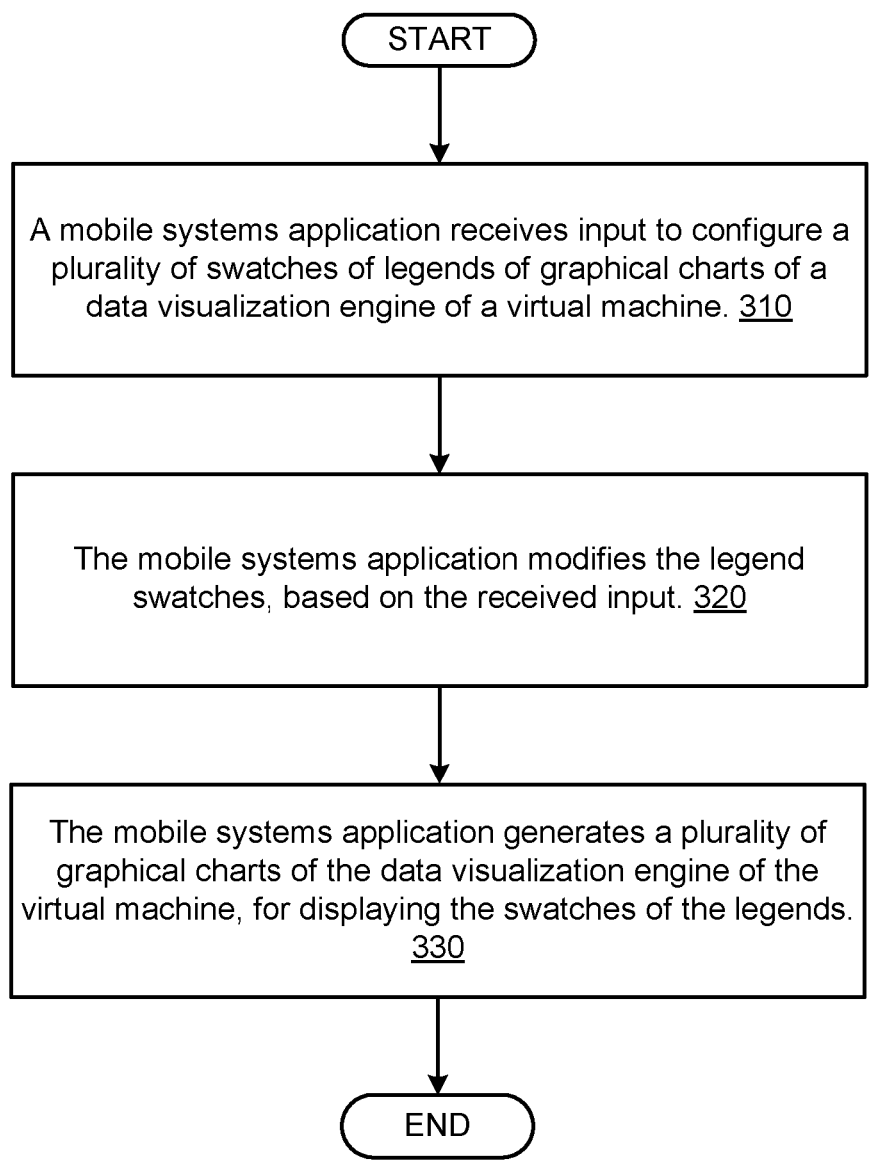
FIG. 3 is a network message flow diagram illustrating the steps carried out by a program for displaying graphical representations of legends in a virtual machine of a mobile computing device according to at least one embodiment.

Referring now to FIG. 3, an operational flowchart 300 illustrating steps carried out by a program for displaying for displaying graphical representations of legends in the virtual machine 210 (FIG. 2) of mobile computing device 102 (FIG.

1), based on preferences of a user, or systems administrator for displaying the graphical representations of the legends in the mobile computing device 102 (FIG. 1), according to embodiments.

At 310, mobile systems application 114A (FIG. 1) input to configure a plurality of swatches of the legends of graphical charts, the input includes at least one of a threshold number of swatches, identification of graphical area for displaying the swatches, and size or data of the swatches for display in the graphical charts of the data virtualization engine, whereby, the plurality of swatches is configured in the graphical legends configuration application 250 (FIG. 2) of the charting application 240 (FIG. 2), for display of the legends, based on the received input. Also, display of the swatches in the graphical charts is controlled by pivots of the data virtualization engine, in the VM 210 (FIG. 2), based on the user preferences. For example, the pivot provides a centralized location of the VM 210, for controlling display of the swatches in the graphical charts. Also, the swatches may be scrollable in an area of the display of the graphical charts, based on the received input of size, or data for displaying the swatches, from the user, or systems administrator. Further, at 320, the mobile systems application 114A modifies the legend swatches, based on the received input. In addition, at 330, the mobile systems application 114A generates a plurality of graphical charts of the virtual machine, for displaying the swatches of the legends, according to embodiments.

Figure 4:
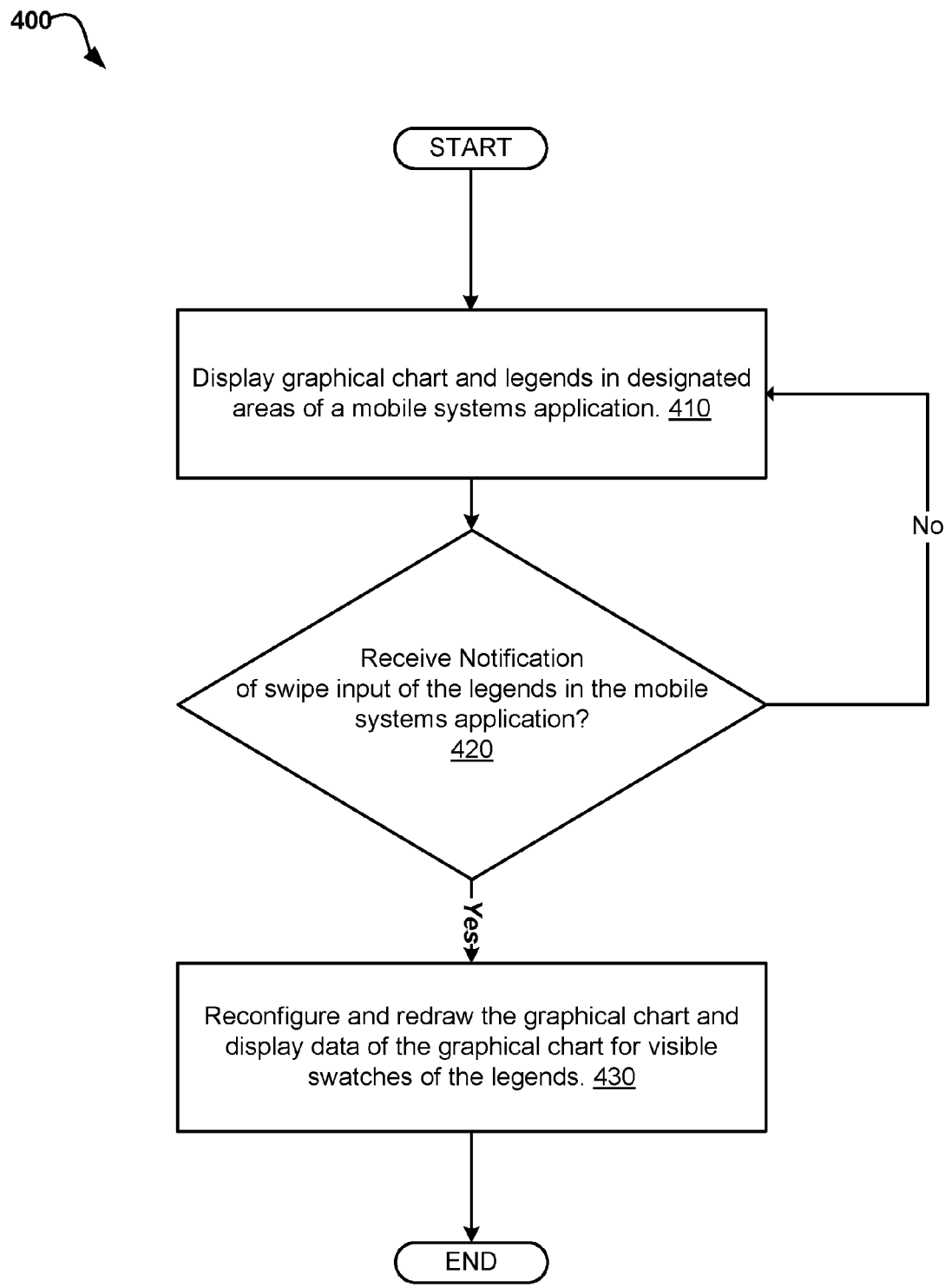
FIG. 4 is an operational flowchart illustrating the steps carried out by a program for displaying graphical representations of data, or information in the mobile computing device, based on preferences of a user, or client of the mobile computing device according to at least one embodiment.

Referring now to FIG. 4, an operational flowchart 400 illustrating steps carried out by a program for displaying graphical representations of data, or information in the mobile computing device 102 (FIG. 1), according to embodiments. At 410, mobile systems application 114A (FIG. 1) displays a graphical chart representation of data, and accompanying legends display of the represented data in the virtual machine 210 (FIG. 2) of mobile operating systems 220 (FIG. 2). For example, at first, the user starts a Mobile App, such as, mobile systems application 114A (FIG. 1), to work with charts and visualizations of data, or information that the user desires to work with or see. As such, the user can then load the desired chart in the application, such as, charting application 240 (FIG. 2), to see or configure the display of the chart. In such a case, the chart will have main visualization and legend sections displayed, in the charting application 240 (FIG. 2), based on the user's preferential configuration for displaying the main chart visualization section or legend section, for displaying the charts in mobile computing device 102 (FIG. 1), according to embodiments.

Next, at 420, it is determined, by mobile systems application 114A (FIG. 2), whether a request to display the graphical chart representation, by the user, or the systems administrator of mobile operating systems 220 (FIG. 2), is received with a notification of swipe input for configuring display of the legends of the mobile systems application 114A (FIG. 2), whereby, for instance, the swipe inputs are configured by the user, or the systems administrator in graphical legends configuration application 250. For example, mobile systems application 114A (FIG. 2), may wait for a user actions for configuring display of the legends section of the chart in charting application 240 (FIG. 2), primarily based user's decision, of whether user desires to see more data of the chart. As such, the user may swipe left, or right, of the charting application 240 (FIG. 2), to configure display on the legends sections of the chart.

If it is determined at 420 that the request to display the graphical chart representation is received with the notification of swipe input for configuring display of legends of the graphical chart in the mobile systems application 114A (FIG. 2), then at 430, graphical legends configuration application reconfigures, recreates, or redraws the display of the graphical chart and display data of the graphical charts in a form of swatches of the legends, in the mobile operation system 220 (FIG. 2), for viewing by the user, or the systems administrator of the mobile computing device 102 (FIG. 1).

However, if it is determined at 420 that the request to display the graphical chart representation is not received with the notification of swipe input for configuring display of legends of the graphical chart in the mobile systems application 114A (FIG. 2), then at 410, mobile systems application 114A (FIG. 1) subsequently displays a graphical chart representation of data, and accompanying legends display of the represented data in the virtual machine 210 (FIG. 2) of mobile operating systems 220 (FIG. 2).

Figure 5:
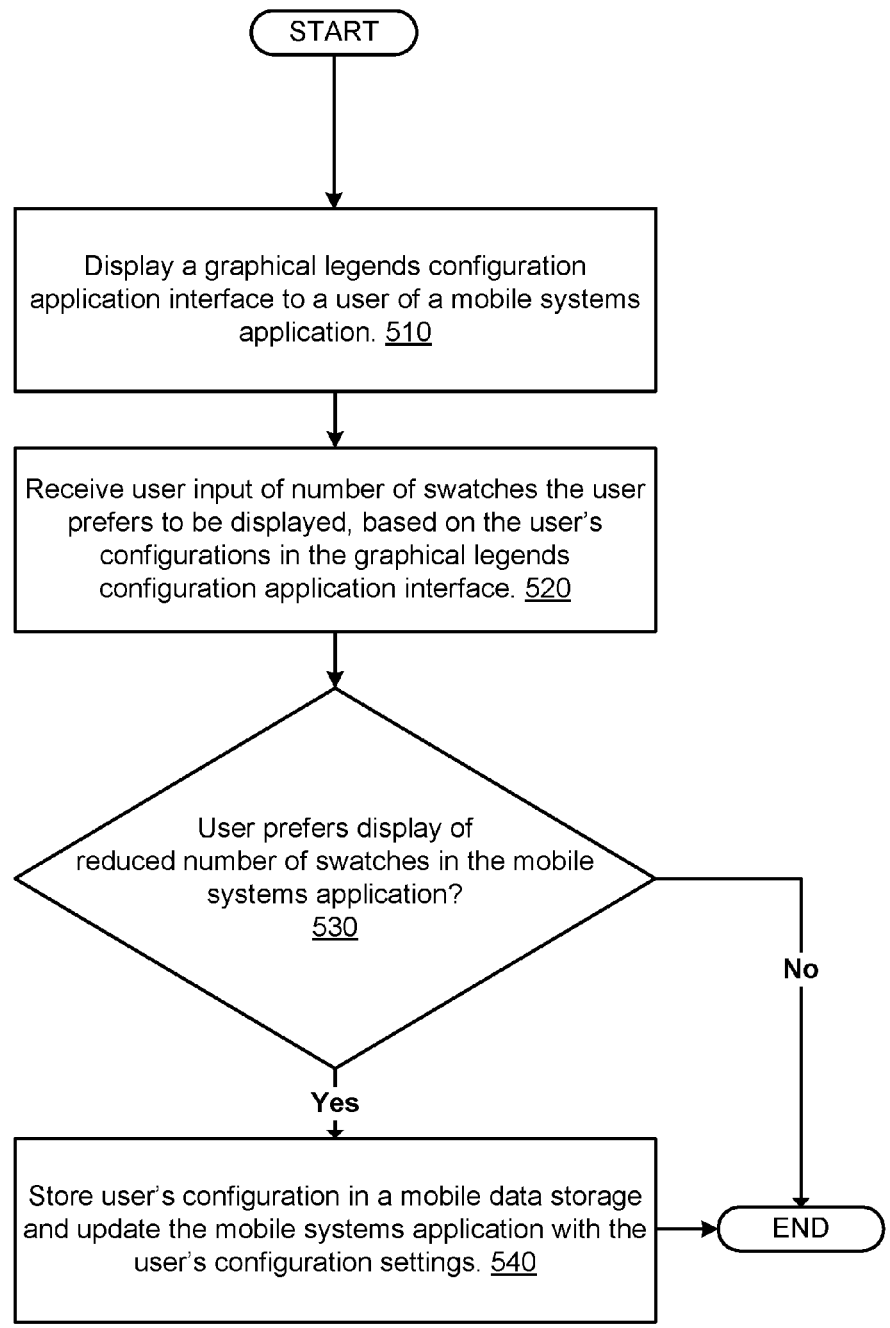
FIG. 5 is an operational flowchart illustrating steps carried out by a program for configuring, in a graphical legends configuration application, display of graphical representations of legends in a display of a mobile computing device, according to at least one embodiment.

Referring now to FIG. 5, an operational flowchart 500 illustrating steps carried out by a program for configuring, in graphical legends configuration application 250 (FIG. 2) of the charting application 230 (FIG. 2), display of graphical representations of legends in the mobile computing device 102 (FIG. 1), based on preferences of a user, or systems administrator for displaying the graphical representations of the legends in mobile computing device 102 (FIG. 1), according to embodiments.

At 510, graphical legends configuration application 250 (FIG. 2) of the charting application 230 (FIG. 2), is displayed to a user of mobile computing device 102 (FIG. 1), for configuring display of legends of graphical representations of data, or information in the mobile computing device 102 (FIG. 1). At 520, graphical legends configuration application 250 (FIG. 2) receives user configuration inputs of a threshold number of swatches of the legends of the graphical chart representation, that the user prefers to be displayed in mobile computing devices 102 (FIG. 1), whereby, the receives input is based on the user's configuration preferences for displaying the graphical legends.

Next at 530, it is determined, by the graphical legends configuration application 250 (FIG. 2), whether the user prefers display of reduced number of swatches of the legends of graphical representations of data, or information, in the mobile computing device 102 (FIG. 1), according to embodiments. If it is determined, by the graphical legends configuration application 250 (FIG. 2), that he user prefers display of reduced number of swatches of the legends of graphical representations of data, or information, in the mobile computing device 102 (FIG. 1), then, at 540, the graphical legends configuration application 250 (FIG. 2) stores the user's preferred configured display of number of swatches of the legends of graphical representations of data, or information, in the mobile computing device 102 (FIG. 1). However, if it is determined by the graphical legends configuration application 250 (FIG. 2) that the user does not prefer display of a reduced number of swatches of the legends of graphical representations of data, or information, in the mobile computing device 102 (FIG. 1), the method ends.

Figure 6:
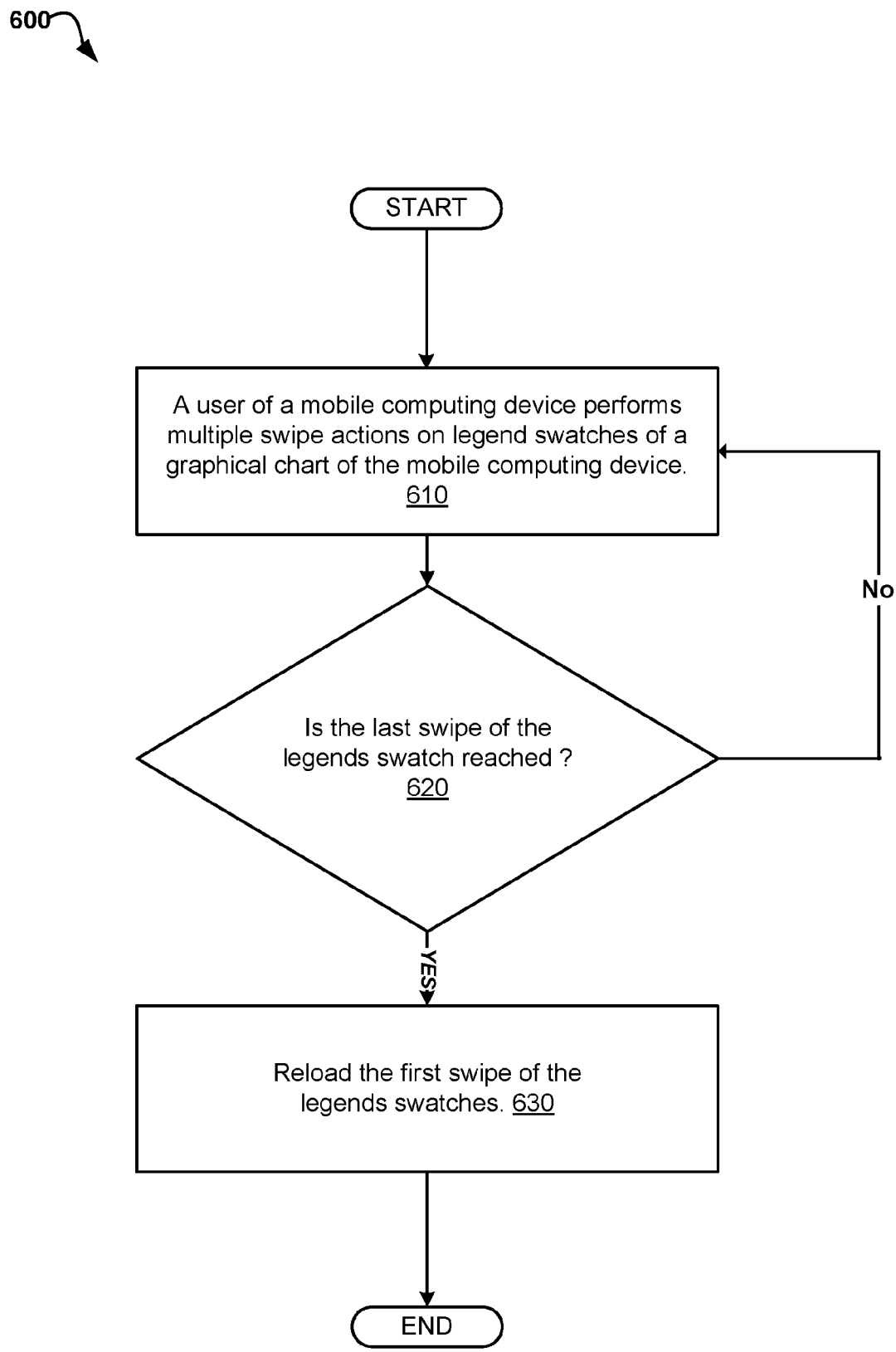
FIG. 6 is an operational flowchart illustrating steps carried out by a program for configuring, in a graphical legends configuration application of a charting application, configuration of display of multiple swipe actions of the graphical representations of legends in the mobile computing device, according to at least one embodiment.

Referring now to FIG. 6, an operational flowchart 600 illustrating steps carried out by a program for configuring, in graphical legends configuration application 250 (FIG. 2) of the charting application 230 (FIG. 2), configuration of display of multiple swipe actions of the graphical representations of legends in the mobile computing device 102 (FIG. 1), based on preferences of a user, or systems administrator for displaying the graphical representations of the legends in mobile computing device 102 (FIG. 1), according to embodiments.

At 610, the user of mobile computing device 102 (FIG. 1), performs multiple swipe action on legends swatch displays, in the graphical legends configuration application 250 (FIG. 2), of the graphical representations of legends. At 620, it is determined whether a final or last swatch of the legends display is reached. As such, if it is determined that the last swatch of legends display is reached, then at 630, the graphical legends configuration application 250 (FIG. 2), reloads a first swatch of the legends swatches in the display of the graphical legends configuration application 250 (FIG. 2), according to at least one implementation of the present embodiment. However, if it is determined, that the last swatch of the legends has not been reached, then, at 610, graphical legends configuration application 250 (FIG. 2), receives input, from the user, of multiple swipe action on legends swatch displays, in the graphical legends configuration application 250 (FIG. 2), of the graphical representations of legends.

Figure 7:
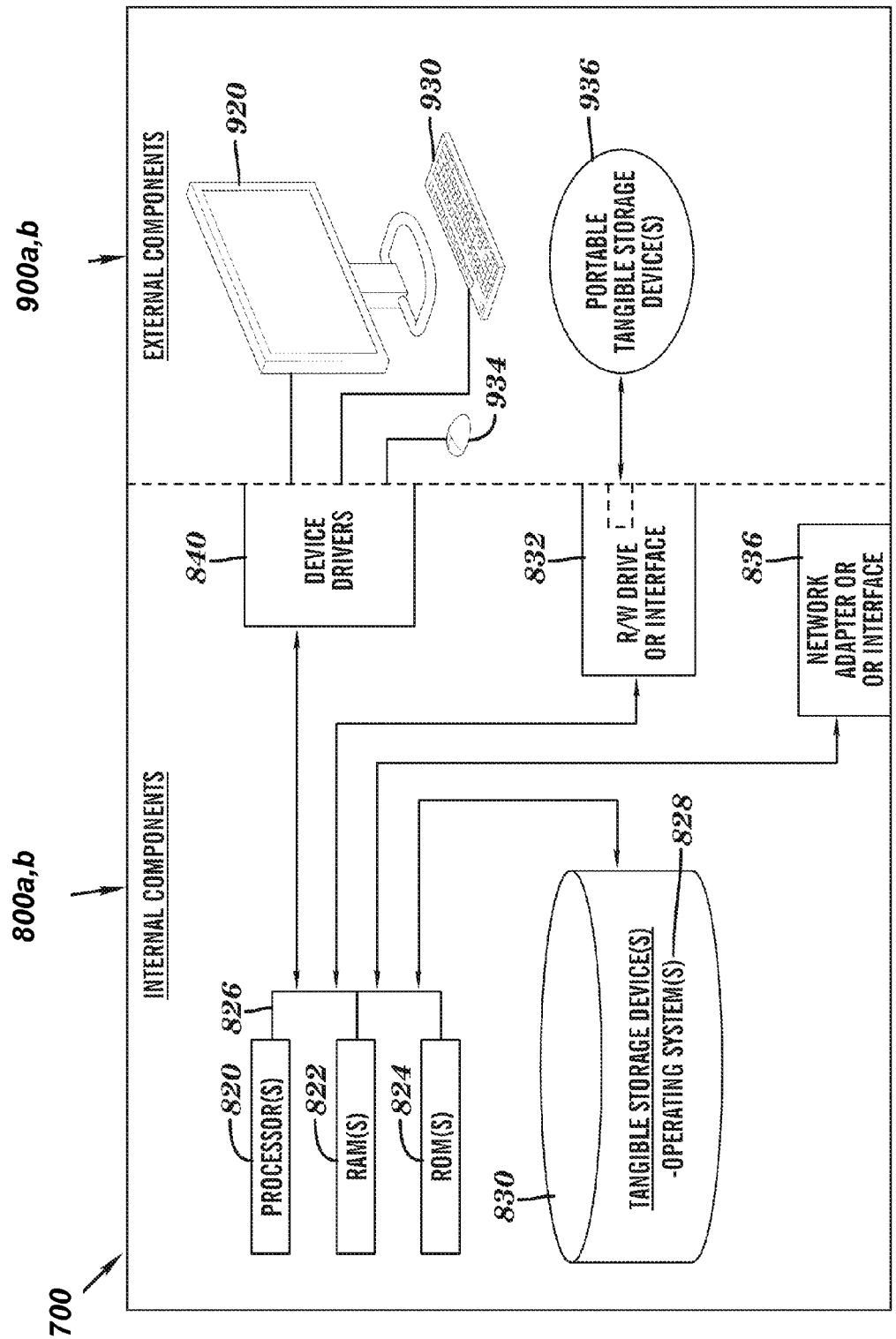
FIG. 7 is a block diagram of internal and external components of computers and servers depicted in FIG. 1 according to at least one embodiment.

FIG. 7 is a block diagram 700 of internal and external components of computers depicted in FIG. 1 in accordance with an illustrative embodiment. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Mobile systems application 114A (FIG. 1), and mobile server application 114B (FIG. 1) may include respective sets of internal components 800a, b and external components 900a, b illustrated in FIG. 7. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software programs 108 (FIG. 1) in mobile computing device 102 (FIG. 1) is stored on one or more of the respective computer-readable tangible storage medium 830 for execution by one or more of the respective processors 820 via one or more of the respective RAMs 822 (which typically include cache memory). In the embodiment illustrated in FIG. 7, each of the computer-readable tangible storage medium 830 is a magnetic disk storage device of an internal hard drive.

Alternatively, each of the computer-readable tangible storage medium 830 is a semiconductor storage device such as ROM 824, EPROM, flash memory or any other computer-readable tangible storage device that can store a computer program and digital information. Each set of internal components 800a, b also includes a R/W drive or interface 832 to read from and write to one or more portable computer-readable tangible storage medium 936 such as a CD-ROM, DVD, memory stick, magnetic tape, magnetic disk, optical disk or semiconductor storage device. A software program 108 (FIG. 1), such as mobile systems application 114A (FIG. 1) can be stored on one or more of the respective portable computer-readable tangible storage medium 936, read via the respective R/W drive or interface 832 and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The software program 108 (FIG. 1) and mobile systems application 114A (FIG. 1) in mobile computing device 102 (FIG. 1) and mobile server application 114B (FIG. 1) can be downloaded to mobile computing device 102 (FIG. 1) and mobile server 112 (FIG. 1), respectively from an external computer via a network (for example, the Internet, a local area network or other, wide area network) and respective network adapters or interfaces 836. From the network adapters or interfaces 836, the code software programs 108 (FIG. 1) and mobile systems application 114A (FIG. 1) in mobile computing device 102 (FIG. 1) and mobile server application 114B in mobile server 112 (FIG. 1) are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product displaying graphical representations of legends in a data visualization engine, comprising a computer-readable storage medium having program code embodied therewith, the program code executable by a processor of a computer to perform a method comprising:

receiving an input to configure a plurality of swatches of the legends of graphical charts, the input comprises at least one of a threshold number of swatches, an identification of graphical area for displaying the swatches, and a size or a data of the swatches for display in the graphical charts of the data visualization engine, swatches of the legends of graphical charts enable plurality of users of a mobile system application to configure display of legends in a graphical legend interface based on user preferences of at least one of the plurality of users, for displaying graphical representations of the legends in the data visualization engine of the mobile system application, wherein the plurality of swatches of the legends of graphical charts are controlled by a pivot of the data virtualization engine based on the user preferences, the pivot providing a centralized location of a Virtual Machine (VM) for controlling display of the swatches in the graphical charts;

modifying the swatches, based on the received input;

generating a plurality of graphical charts of the data visualization engine for displaying the swatches, based on the modification, wherein the display is generated randomly, based on the user references for displaying the swatches.

* * * * *